Dec. 14, 1943.  R. S. TAYLOR  2,336,513
SPEED CHANGE SYSTEM
Filed Sept. 2, 1939  5 Sheets-Sheet 1
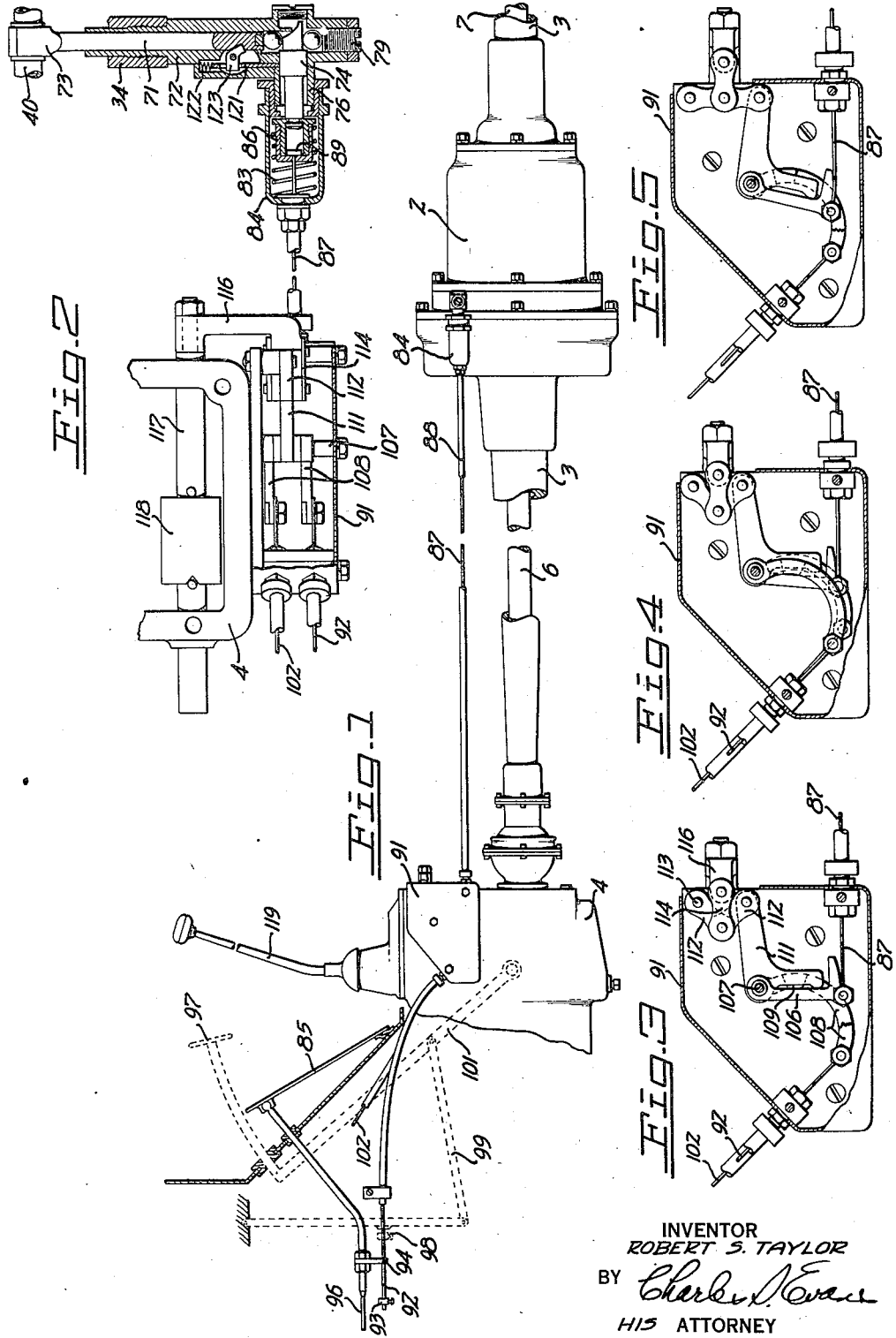
INVENTOR
ROBERT S. TAYLOR
BY Charles J. Evans
HIS ATTORNEY

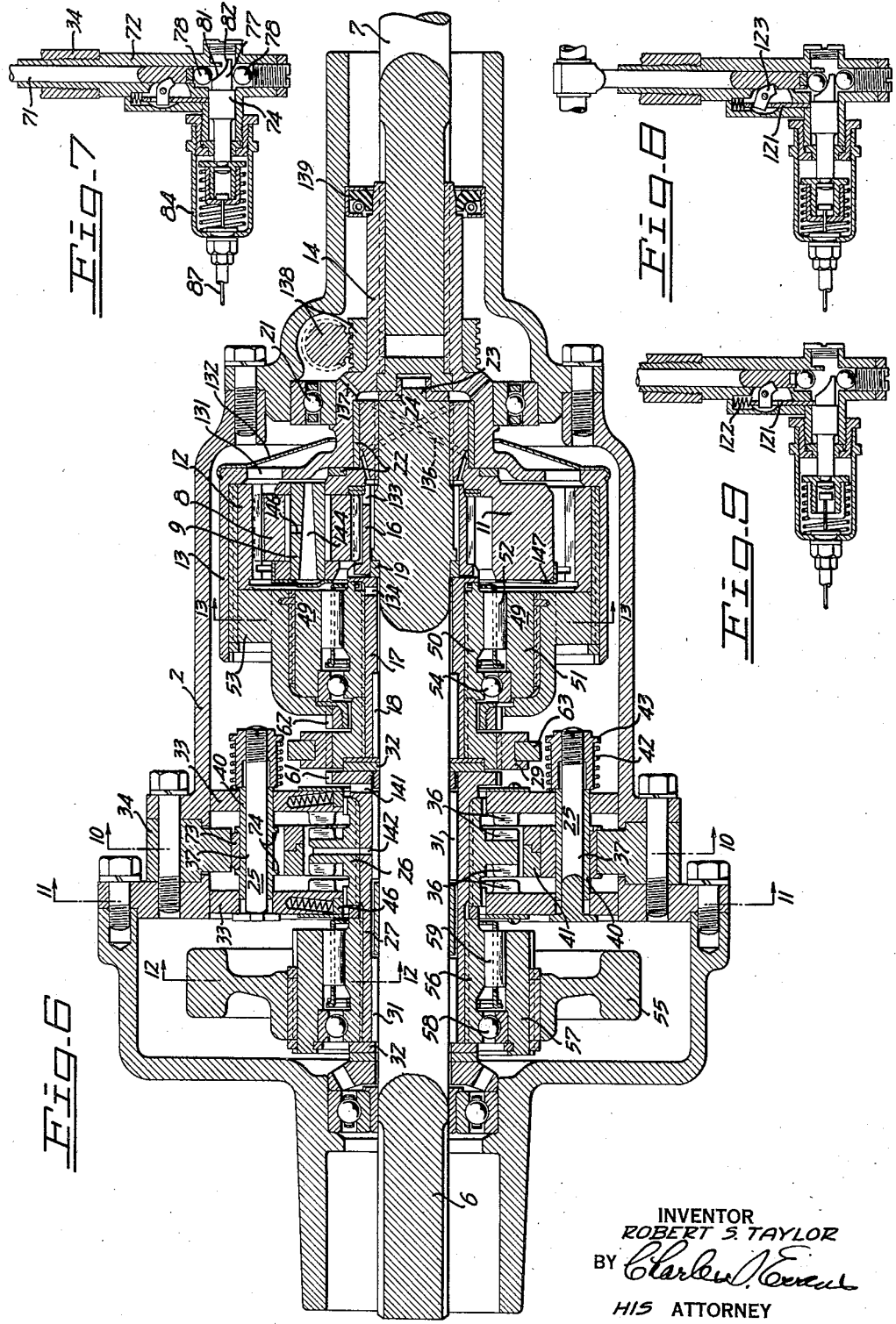

Dec. 14, 1943.   R. S. TAYLOR   2,336,513
SPEED CHANGE SYSTEM
Filed Sept. 2, 1939   5 Sheets-Sheet 3
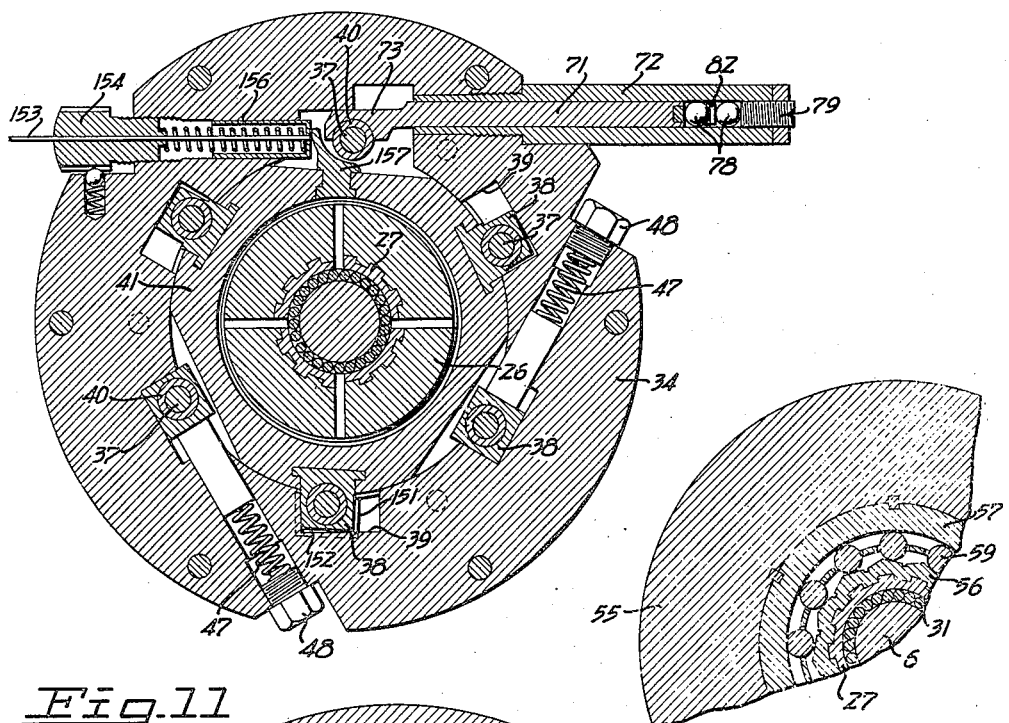
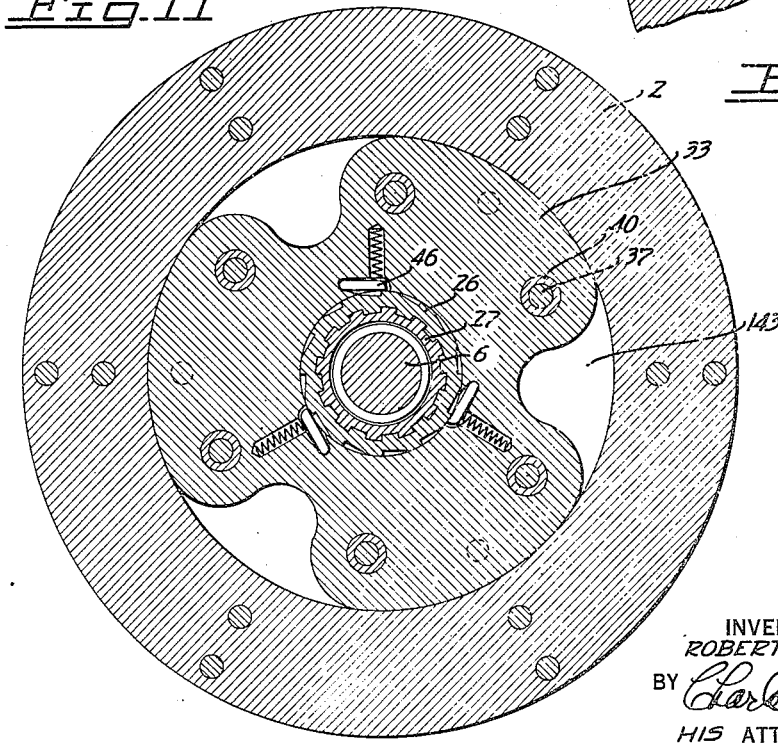
INVENTOR
ROBERT S. TAYLOR
BY Charles S. Evans
HIS ATTORNEY Dec. 14, 1943. R. S. TAYLOR 2,336,513
SPEED CHANGE SYSTEM
Filed Sept. 2, 1939 5 Sheets-Sheet 4
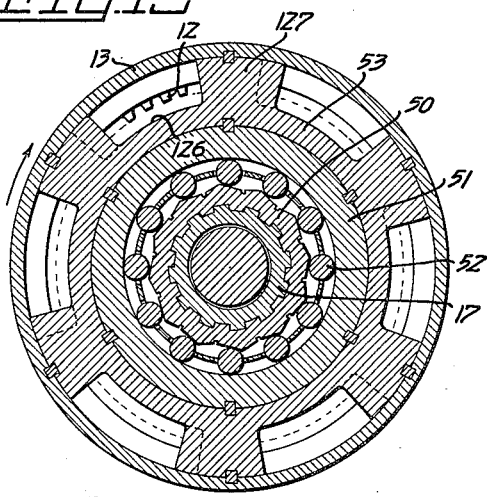
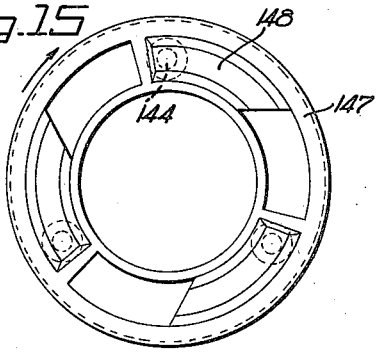
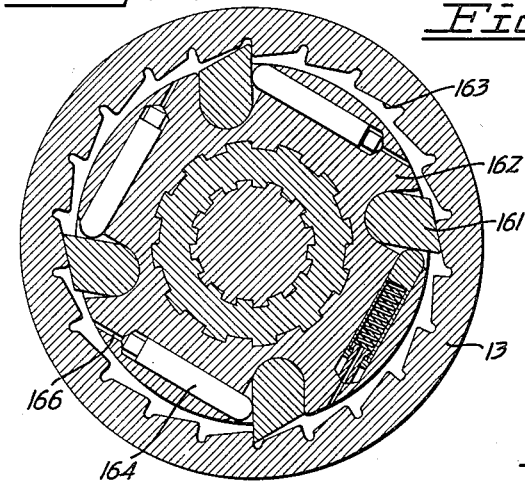
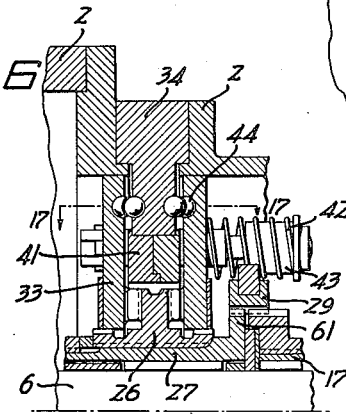
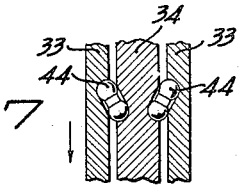
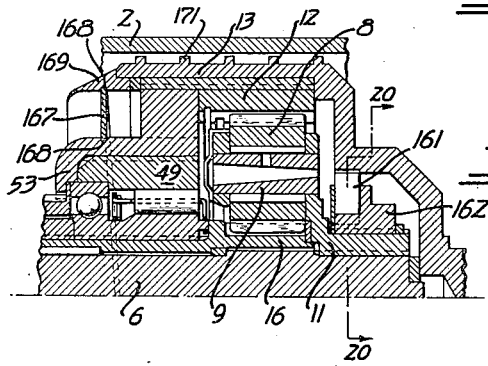
INVENTOR
ROBERT S. TAYLOR
BY
HIS ATTORNEY Dec. 14, 1943.    R. S. TAYLOR    2,336,513
SPEED CHANGE SYSTEM
Filed Sept. 2, 1939    5 Sheets-Sheet 5

DIRECT DRIVE

CHANGE FROM DIRECT TO OVERDRIVE (COASTING LOAD)

OVERDRIVE

CHANGE FROM OVERDRIVE TO DIRECT (DRIVING LOAD)

INVENTOR
ROBERT S. TAYLOR
BY
HIS ATTORNEY

Patented Dec. 14, 1943

2,336,513

UNITED STATES PATENT OFFICE 2,336,513

SPEED CHANGE SYSTEM

Robert S. Taylor, Seattle, Wash.

Application September 2, 1939, Serial No. 293,214

2 Claims. (Cl. 74—472)

My invention relates to mechanism for changing speed ratios in vehicles; and more particularly to an auxiliary overdrive transmission for automobiles.

It is among the objects of my invention to provide improved means for controlling the operation of a speed change system to give better performance under varying driving conditions.

Another object is to provide a semi-automatic auxiliary transmission in which the automatic operation of the unit is modified by manual control.

Another object is to provide an overdrive transmission which automatically changes between overdrive and direct drive in response to rotational and torque conditions between the shafts.

Further objects include the provision, in a transmission of the character described, of means for locking the unit in overdrive, and means associated with the regular gear shift and accelerator mechanisms for controlling the locking means.

A still further object is to provide an improved oiling system for the transmission.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawings:

Figure 1 is a side elevational view showing my auxiliary transmission unit interposed in the torque tube of an automobile.

Figure 2 is a plan view, partly in section, illustrating the overdrive lock and control mechanism.

Figures 3 to 5 are side views of the control mechanism, with portions of the case broken away to show the parts in various operative positions.

Figure 6 is an axial sectional view of the overdrive transmission embodying the improvements of my invention.

Figures 7 to 9 are detail sectional views of the overdrive lock, illustrating the parts in various operative positions.

Figure 10 is a transverse sectional view of the transmission, taken in a plane indicated by line 10—10 of Figure 6, showing portions of the overdrive brake and lock mechanism.

Figure 11 is a transverse sectional view of the transmission, taken in a plane indicated by line 11—11 of Figure 6, illustrating one of the overdrive brake plates and ratchets.

Figure 12 is a fragmentary transverse sectional view of the transmission, taken in a plane indicated by line 12—12 of Figure 6, showing the inertia wheel and its clutch.

Figure 13 is a transverse sectional view of the transmission taken in a plane indicated by line 13—13 of Figure 6, illustrating the direct drive clutch and oil pump for the planetary system.

Figure 14 is a fragmentary side elevational view of the pump ring apart from the rotor.

Figure 15 is an end elevational view of the auxiliary oil pump for the planet pinions.

Figure 16 is a fragmentary axial sectional view of the transmission, showing the overdrive brake engaged.

Figures 17 and 18 are detail sectional views taken in a plane indicated by line 17—17 of Figure 16, illustrating the brake actuating toggles and plates in engaged and disengaged positions.

Figure 19 is a fragmentary axial sectional view of the transmission, showing a modified structure embodying a safety ratchet for direct drive; and Figure 20 is a fragmentary sectional view of the ratchet, taken in a plane indicated by line 20—20 of Figure 19.

Figure 21:
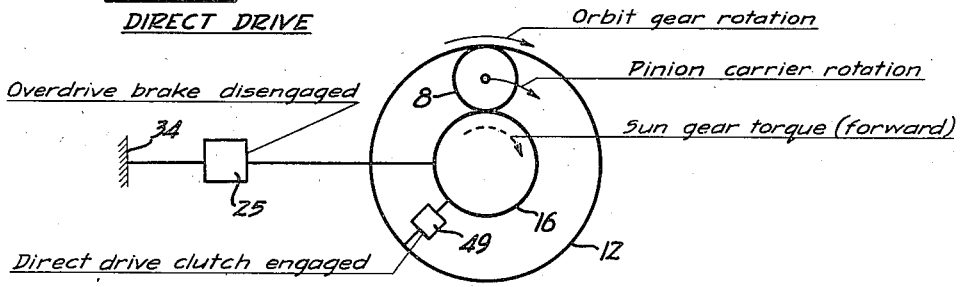
Figures 21 to 24 are diagrammatic views showing the rotational and torque conditions in the planetary system at various stages of operation.

Auxiliary overdrive transmissions are being widely used in automobiles because higher gear ratios result in lower engine speed and increased fuel economy. These auxiliary transmissions are usually automatic, and many of those developed in the past are governed by centrifugal weights to cut in the overdrive at a predetermined critical speed, say 40 M. P. H. Such speed controlled units have definite limitations because the overdrive cannot be brought into play until the critical speed has been attained, and furthermore the overdrive cannot be cut out once the critical speed has been exceeded. For example, if a car is traveling say 50 M. P. H. and the driver wishes to pass another vehicle it is highly desirable to drop back into direct drive (standard high gear), because the presence of the overdrive affords too high a gear ratio for quick acceleration.

I have overcome the undesirable features of past overdrive gearings by providing a unit which automatically changes between overdrive and direct drive in response to rotational and torque conditions between the shafts; and in which the automatic operation is modified by controls associated with the regular gear shift and accelerator mechanisms to allow the unit to change back to direct drive at such times when eliminating the overdrive is desirable from the standpoint of engine performance.

In terms of broad inclusion, my speed change mechanism for vehicles comprises a gear system preferably incorporated as an auxiliary transmission in an automobile. Automatic means associated with the gear system are provided for effecting different speed ratios; and means cooperating with a movable element of the vehicle are provided for controlling operation of the automatic means. The automatic means is preferably responsive to rotational and torque conditions in the gear system, and the control means is preferably associated with the regular gear shift and throttle mechanisms of the vehicle. My invention also embraces means for oiling the gear system.

In greater detail, and referring to Figure 1 of the drawings, the auxiliary transmission embodying my invention is enclosed in a housing 2 interposed in torque tube 3 of an automobile behind the regular transmission 4. The leading portion 6 of the propeller shaft provides the drive shaft for my unit, and the trailing portion 7 forms the driven shaft. When power is being transmitted through the unit from drive shaft 6 to driven shaft 7 the mechanism is subjected to a certain kind of loading, which I call a "driving load"; and when the rear wheels of the car tend to overrun the rate at which they are driven the mechanism is subjected to a different loading, which I term "coasting load."

The speed change mechanism within housing 2 is preferably an overdrive gear system, preferably along the lines disclosed in my copending applications, Serial No. 177,902 filed December 3, 1937, and Serial No. 239,057 filed November 5, 1938.

As shown in Figure 6, the overdrive transmission comprises a planetary gear system having a planet pinion 8 journaled on a short shaft 9 mounted on a carrier 11 splined to drive shaft 6. Orbit gear 12 of the planetary system is fixed within a drum shaped rotor 13 having a hub portion 14 splined on driven shaft 7. Sun gear 16 is end splined to a sleeve 17 journaled about the drive shaft on a needle bearing 18 and provided with a thrust bearing 19 abutting a shoulder on the drive shaft.

The planetary system is journaled in a main bearing 21 interposed between the hub of rotor 13 and the housing. Other suitable bearing rings 22 are arranged between the parts of the planetary system. Also, a reduced end 23 of drive shaft 6 is preferably journaled in a pilot bearing 24 mounted coaxially in the end of hub 14.

Means are provided for holding the sun gear against rotation for planetary operation of the gear system to establish an overdrive connection between the shafts. For this purpose a one-way brake generally indicated by reference numeral 25 is arranged to lock the sun gear to the housing; the brake being engaged by reverse (counterclockwise) rotation of the sun gear under coasting load, and disengaged when the torque of the sun gear in the forward (clockwise) direction under driving load exceeds a predetermined value. In the present specification the references to direction of rotation (clockwise and counterclockwise) are taken as viewed from the left in Figure 6; the clockwise rotation being considered as forward since it is the direction of engine rotation.

The brake for establishing the overdrive connection (overdrive brake) comprises a central element 26 splined on a sleeve 27 connectable to the sun gear sleeve through a manually shiftable member 29. Sleeve 27 is journaled on the drive shaft on suitable needle bearings 31; and bearing rings 32 are provided between the ends of the sleeve and adjacent parts. The brake further comprises a pair of annular plates 33 having a limited degree of turning movement with respect to a fixed element 34 of the housing, and having simultaneous lateral movement axially of the unit from the extended position shown in Figure 6 to the collapsed position shown in Figure 16. Complementary teeth 36 are provided on central element 26 and plates 33 of the brake, which teeth are disengaged when the plates are extended and engaged when the plates are collapsed.

Limited turning movement between brake plates 33 and fixed element 34 is provided for by the arrangement shown in Figure 10, comprising a series of pins 37 extending through the plates, and all but one of which pass through guide blocks 38 slidable in notches 39 formed along the inner periphery of the annular fixed element 34. Sleeves 40 surrounding the pins are press fitted in blocks 38 and provide slideways for lateral movement of the plates axially of the pins. Blocks 38 are preferably secured on a ring 41 journaled for oscillation within fixed element 34 to provide added bearing for the plates in their turning movement. As shown in Figure 6, ring 41 is preferably made in two pieces for convenience in assembly.

Springs 42 are provided about projecting ends of pins 37 for urging the brake plates 33 toward collapsed position, and suitable collars 43 are preferably mounted on the pins for limiting outward movement of the plates. Extension and collapse of the plates is controlled by toggle links 44 pivotally connected between the plates and fixed elements 34. As shown in Figures 17 and 18, the toggles operate to collapse the plates when the latter turn backward (counterclockwise); and function to extend the plates when the latter turn forward (clockwise) relative to the fixed element. Backward turning movement is transmitted from the sun gear to the plates by means of spring pressed pawls 46 mounted on the plates and engaging suitable ratchet teeth on central brake element 26, as shown in Figure 11.

When plates 33 are collapsed to engage the brake the sun gear is held against forward (clockwise) rotation by the holding action of the toggles. The torque of the sun gear is of course transmitted to the brake plates through the engaged teeth 36, and if sufficient clockwise torque is put on the plates the toggles will be extended against the action of springs 42 to disengage the plates from central element 26, thereby releasing the sun gear. Subsequent backward turning of the sun gear then causes the toggles to collapse due to the fact that this backward motion is transmitted to he brake plates through ratchet pawls 46.

By this one-way brake arrangement the latter is engaged to hold the sun gear when it turns in a reverse (counterclockwise) direction, and is disengaged when the torque of the sun gear in the forward (clockwise) direction exceeds a predetermined value. The brake is not a friction device for holding the sun gear, but is a positively engaging brake for locking the sun gear to the fixed element.

It is to be noted that brake plates 33 close with a combined inward and turning motion by reason of the toggle action, and that the teeth on plates 33 are turning in the same direction as the teeth on element 26 at the time of engagement; and it is further to be noted that the brake engages when the sun gear is just starting to turn backwards and at a time (coasting load) when no driving load is being transmitted through the mechanism. This particular action provides for synchromeshing of teeth 36, whereby the brake engages smoothly and without shock.

Figure 18 shows that toggles 46 are slightly over center in the open position, so that the plates tend to stay extended until reverse thrust on the plaes is sufficient to throw the toggles back over center. This stabilizes the brake in its open position, and prevents the brake plates from closing too easily. However, little torque is required to collapse the toggles compared to that needed for their opening movement.

On the other hand, disengagement of the brake is responsive to turning of the sun gear in the opposite (forward) direction, and it also dependent upon the torque of the sun gear in this direction. The angular position of the closed toggles requires considerable torque to open them against the action of springs 42. Once the toggles start extending however they offer less and less resistance to opening movement, so that torque sufficient to start opening them is sufficient to insure complete opening movement. Quick opening action is further provided by tangent springs 47 (Figure 10) interposed between screws 48 and blocks 39. These springs urge the plates forward and function to snap the toggles into final open position once the initial resistance of the toggles has been overcome by the torque of the sun gear.

When the brake is engaged, sun gear 16 is locked to fixed element 34. The act of holding the sun gear against rotation establishes an overdrive connection between the shafts through the planetary gearing. In other words, the driving thrust is transmitted from drive shaft 6 to orbit gear 12 through planet pinion 9 which planetates about the fixed sun gear. The orbit gear thus rotates in a forward (clockwise) direction at a faster rate than the drive shaft, and this overdrive speed is reflected by increased speed of driven shaft 7.

Means are also provided for locking the gears of the planetary system together for unitary rotation to establish a direct or one-to-one drive connection between the shafts when the sun gear is released by disengagement of the overdrive brake. For this purpose a one-way or overrunning clutch generally indicated by reference numeral 49 is interposed between parts of the planetary system, preferably between the sun and orbit gears; and comprises a pair of clutch rings 50 and 51 between which a series of clutch rollers 52 are disposed. The inner ring 50 is splined to sun gear sleeve 17, and the outer ring 51 is secured to the orbit gear rotor through a connecting ring 53 secured within the rotor alongside the orbit gear. A ball bearing 54 is also interposed between the clutch rings to provide a journal when the clutch is overrunning. Figure 13 shows a detail of the clutch parts.

The one-way clutch operates to lock the gears together whenever the sun gear is free and the drive shaft tends to overrun the driven shaft, thus establishing the direct drive connection. It is to be noted that the direct drive clutch is interposed between the sun and orbit gears of the planetary system, so that the driving thrust is partly transmitted through the planet pinion and partly through the clutch. If the clutch were interposed directly between the shafts the driving thrust would be carried entirely by the clutch, whereas in my arrangement the clutch carries only part of the load and is thereby subjected to less stress and wear. It is further to be noted that the one-way clutch cooperates with the sun gear brake in the overdrive relationship, because when the sun gear is held the orbit gear overrides the sun, which it is free to do by the one-way action of the clutch.

In order to reduce shock when the load is picked up by direct drive clutch 49, I preferably apply an independent load on the sun gear, whereby the thrust of the drive shaft is divided and balanced between the car load on the driven shaft and the independent load on the sun gear during the period of speed change. By this means the sun gear accelerates gradually (as the independent load is overcome) until it reaches the speed of the orbit gear. This is equivalent to providing a moving fulcrum for the power thrust during the speed change, and results in a quiet, smooth action without interruption in the transfer of driving thrust from one shaft to another.

The independent load is preferably supplied by a small fly wheel 55 operatively connected with the sun gear to increase the inertia of the latter during the period of shift from overdrive to direct drive. This fly wheel is preferably mounted on sun gear extension sleeve 27, and a one-way or overrunning clutch is preferably interposed between the fly wheel and sleeve to allow the sun gear to pick up the load of the fly wheel only in the forward direction of sun gear rotation. The fly wheel therefore does not resist backward rotation of the sun gear at the time of brake engagement. The one-way clutch preferably comprises rings 56 and 57 separated by a bearing 58 and embracing the clutch roller 59; the inner ring being splined to sleeve 27, and the outer ring providing a carrier for the fly wheel. Instead of using a fly wheel, any other suitable inertia means may be provided for supplying an independent load for the sun gear.

Means are also preferably provided for optionally locking the sun gear to the orbit gear to positively connect them for unitary rotation. For this purpose the clutch member 29 is shiftable to engage either teeth 61 on sleeve 27 or teeth 62 on an element splined to bell ring 53 of the orbit gear head. In the latter case the overdrive brake is rendered inactive, and the unit is positively locked in direct drive. Suitable shifting means such as a yoke 63 connected with a lever in the driver's compartment is arranged to give the driver control of this optional shift.

Referring to Figures 21 to 24, the operation of the transmission thus far described is as follows: Consider that optionally shiftable clutch member 29 is engaged with teeth 61 to render the overdrive brake active, and also consider that the overdrive brake is disengaged. Under these conditions the sun gear is free and the parts of the planetary system are locked together for direct drive through one-way clutch 49 as long as a driving load is being transmitted through the gearing. At this time the torque of the sun gear is forward (clockwise) as shown in Figure 21, and the sun gear is prevented from rotating forwardly faster than the orbit gear by reason of the one-way clutch.

Figure 22:
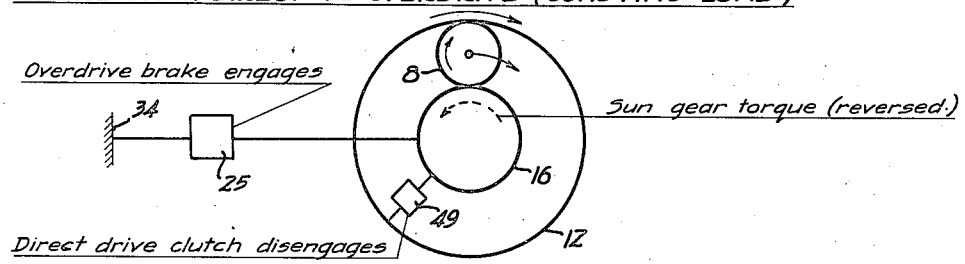

When the momentum of the car puts a coasting load on the unit, the orbit gear tends to rotate clockwise faster than the rate at which it is being driven from the engine. This causes the planet pinion to start turning clockwise about its own axis, causing a reversal of torque on the sun gear and tending to turn the latter backward (counterclockwise). As a result, brake plates 33 are turned backward through ratchet 46, thus collapsing toggles 44 to engage the brake and lock the sun gear to the fixed element. As soon as the sun gear is locked the pinion is forced to planetate about it, thus establishing an overdrive connection between the shafts. At this time the direct drive clutch 49 disengages because the orbit gear starts overrunning the sun gear in a clockwise direction. Figure 22 shows the rotational and torque relationships between the parts during the period of shift from direct to overdrive.

Figure 23:
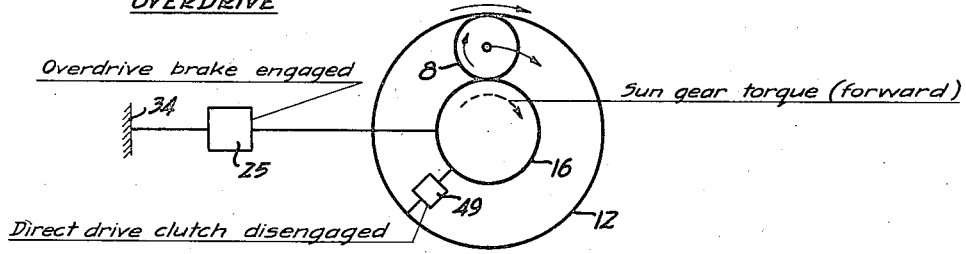
Figure 24:
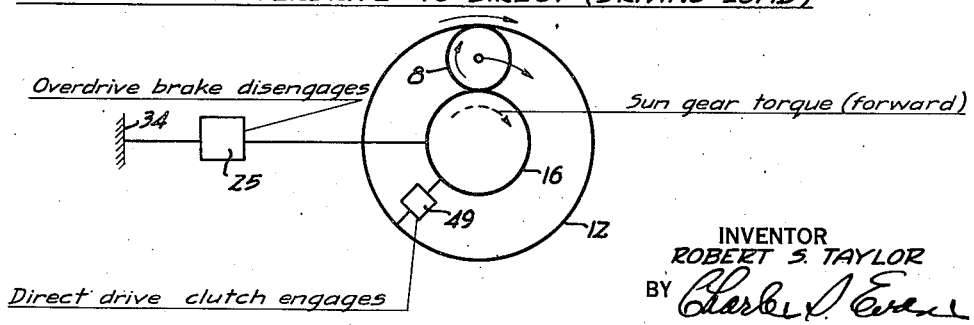

Once the sun gear is locked and the overdrive connection established, the driving thrust is transmitted from the drive to the driven shaft through the planetating pinions, and during planetation of the system the sun gear torque is again forward as shown in Figure 23. The sun gear is prevented from turning in this direction however because of the engaged brake. At this time the forward torque of the sun gear is transmitted to brake plates 33 through engaged teeth 36, tending to open the toggles against the holding action of springs 42. As already mentioned, the torque necessary to open the toggles is considerable, and is calculated to maintain the overdrive connection until the torque of the sun gear exceeds a predetermined value.

When the forward torque of the sun gear is sufficient to disengage the brake, the sun gear is released. Immediately the sun gear tends to spin clockwise, but it is prevented from rapid acceleration by reason of the inertia of fly wheel 55. As the inertia of the independent load imposed by the fly wheel is overcome however, the sun gear gradually accelerates up to the speed of the orbit gear, and when the sun gear tends to exceed the speed of the orbit gear, clutch 49 engages to lock the gears together for unitary rotation to establish the direct drive connection. See Figure 24.

While the transmission thus far described is an entirely practical unit, I have found that it possesses certain inherent limitations as far as the performance of the car is concerned. For example, the unloading torque of the overdrive brake cannot be set to disengage the brake at lower speeds and still be sufficient to maintain the overdrive connection at higher speeds, it being understood that the torque on the sun gear increases with the speed due to the increased power requirement for fast acceleration. In order to prevent the unit from dropping back into direct at the higher speeds I provide means for locking the unit in the overdrive connection. However, when the unit is locked in overdrive at higher car speeds another problem is presented. Thus, when a car is traveling along at say 50 M. P. H. and the driver wishes to pass another vehicle he needs to be able to give rapid acceleration to his car. Rapid acceleration in overdrive is not possible because of the high gear ratio, and it is therefore desirable to momentarily drop back into direct drive (normal high gear). I therefore also provide means for disengaging the overdrive lock; this lock control means being preferably associated with the regular gear shift and accelerator mechanisms of the vehicle to synchronize the lock action with the manually operated elements of these mechanisms.

The overdrive lock and control mechanism is shown in Figures 1 to 10. As shown in Figure 10, a thrust rod 71 is slidably mounted in a tube 72 mounted tangentially on fixed element 34 so that the outer end of the tube is external of the transmission housing. The inner end of rod 71 terminates in a yoke 73 embracing a sleeve of one of the brake pins 37, the pin sleeve 40 in this instance being provided with two flanges 74 for retaining the yoke 73, as shown in Figure 6. Rod 71 therefore slides back and forth in tube 72 when blocks 38 oscillate in notches 39 during the engaging and disengaging movement of the brake plates 33. Figure 10 shows blocks 38 in their clockwise limit of movement, which is their position when the brake is disengaged (direct drive). When the blocks move to their counterclockwise limit of movement the brake is engaged (overdrive), and at this time rod 71 moves inwardly with respect to the outer end of housing tube 72.

Referring now to the horizontal sectional view of Figures 2 and 7, it is seen that if means are provided for holding rod 71 in its inward position the brake will be prevented from disengaging and the unit will be locked in overdrive. The lock preferably comprises a plunger 74 slidable within a transverse neck portion 76 of tube 72. When the plunger is extended inwardly its end portion 77 is interposed between a pair of balls 78 lying between rod 71 and a plug 79 in the end of the tube. The inside of tube 72 is oval-shaped to provide an enlarged cavity for the balls so that the latter are permitted a degree of transverse rolling action to allow the plunger to be withdrawn easily. This anti-friction locking device is very important, because there are times when the plunger must be withdrawn under the axial thrust imposed on rod 71 by the torque of the sun gear.

End 77 of the plunger is preferably tapered off along an inclined plane 81 so that slight retracting movement of the plunger is sufficient to cause the plunger to be fully retracted by the compression of the balls under axial thrust of rod 71. A lip 82 at the extreme end of the plunger serves to keep the balls separated when the plunger is fully retracted. The plunger is normally pressed forward by a spring 83 interposed between a housing cup 84 and a cap 86 on the end of the plunger. The thrust of this spring is sufficient to extend the plunger between the balls when rod 71 slides back to overdrive position. By this arrangement the unit is automatically locked in overdrive whenever the plunger is conditioned for extension between the balls.

Means associated with the throttle pedal 85 (Figure 1) of the accelerator mechanism are provided for retracting lock plunger 74. For this purpose a pull wire 87 protected by a tube 88 is projected into the end of housing cup 84 and provided with a head 89 within plunger cap 86. This arrangement provides a telescoping action between the plunger and the wire, so that the plunger is free to retract a greater distance than the pull wire movement. The forward end of pull wire 87 is carried to a mechanism in a case 91 on the side of the regular transmission housing 4, and from this mechanism another pull wire 92 is carried forward and provided with a stop 93 to be engaged by a part 94 of the throttle rod 96. These parts are so arranged that when throttle pedal 85 is fully depressed wire 92 is pulled forward slightly. This pulling movement is carried back through the mechanism in case 91 as shown in Figure 4 and hence through wire 87 to retract plunger 74 a short distance, say ⅛ inch or less, sufficient to allow a ball 78 to move under inclined plane 81 of the plunger as shown in Figure 7, whereby the ball will lift the plunger up if the torque of the sun gear is imparting axial thrust to rod 71, thereby allowing the auxiliary transmission to change to direct drive. When the unit is in direct drive under these circumstances the lock plunger 74 merely sets on one of the balls, as shown in Figure 8, and will relock immediately upon the unit going back into ovedrive.

This control arrangement permits the driver to disconnect the overdrive lock and drop into direct drive at any time under driving load by simply fully depressing the throttle pedal. The times when it is desirable to go into direct drive in the higher speed ranges are those when greater power is required, as when the driver wishes to pass another car, and the natural thing to do at this time is to depress the throttle pedal. Of course the lock disengagement is by manual control, but the driver does not have to pull a separate button or lever, he merely depresses the throttle pedal which he would do in any event under the circumstances. This change from overdrive to direct during driving load (open throttle) is an important feature of my invention.

Instead of connecting pull wire 92 with the throttle pedal it may be associated with the clutch pedal 97 by a stop 98 engageable by a linkage 99 connected with the clutch pedal lever 101. This arrangement is less desirable however, because it does not correspond with the natural sequence of driving operation. If desired, connections with both the throttle and clutch pedals may be provided. A second pull wire 102 is also preferably provided to operate independently of pull wire 92, the second wire being connected to a pull button or lever on the dash board for independent manual control of the lock plunger to condition the unit to change to direct drive, should the torque conditions be such as to effect such change. The pull wire 102 is limited by a suitable stop so that the plunger 74 retracts only to the position shown in Figure 8, whereby the plunger may move back to the locking position.

The coaction of the overdrive lock with the normal automatic operation of the transmission will be readily appreciated. Thus, assume that the car is traveling with the unit locked in overdrive, and that the driver wishes to pass another vehicle. He steps down fully on the throttle pedal to retract lock plunger 74, thus allowing the torque of the sun gear to release the overdrive brake in accordance with the mode of operation described in connection with Figure 24. The establishment of the direct drive connection drops the gear ratio to normal high gear, and the engine speeds up to provide greater power for accelerating the car about the vehicle to be passed. After passing the vehicle the driver naturally lets up on the throttle pedal, and the subsequent coasting load reverses the torque on the sun gear and automatically shifts back into overdrive in accordance with the mode of operation described in connection with Figure 22, whereupon the plunger 74 reseats itself between the balls to again lock the unit in overdrive.

The only other condition to take care of is that of releasing the overdrive lock whenever the regular transmission is shifted back into a lower gear or reverse, so that the auxiliary unit may go into direct to lower the gear ratio for starting loads. This is accomplished by the mechanism in case 91. As shown in Figures 2 and 3, pull wire 87 from the lock plunger is connected to a lever 106 pivoted on a pin 107. A pair of C-shaped levers 108 are also pivoted on pin 107, and are connected with pull wires 92 and 102. Levers 108 each have a lug 109 engageable with lever 106, so that movement of either lever 108 causes movement of lever 106, thereby tensioning pull wire 87 to retract plunger 74.

A bell crank 111 is also pivoted on pin 107 and has one arm adapted to bear against lever 106. The other arm of the bell crank is connected to one of a pair of spreader links 112, the other link of which is pivoted to a fixed pin 113. A third link 114 is connected to the central pivot of the spreader link and is fastened to a bracket 116 on the usual intermediate-high shift rod 117 of the regular transmission. In some types of transmissions the shifting yoke 118 slides along a fixed rod, and in these cases the rod would be made slidable and shifting yoke 118 pinned to it.

Whenever the regular transmission lever 119 is shifted to or through neutral the spreader links 112 are extended as shown in Figure 5. If shifted to neutral or into low or reverse gear the links stay extended, and if shifted through neutral from high to intermediate gear or vice versa the links are extended and then collapsed in the opposite direction. In any case there is a period when the links are extended and this operates to turn lever 106 and move pull wire 87. In Figure 5 it will be seen that the extension of links 112 causes considerable movement of pull wire 87. This movement is sufficient to retract lock plunger 74 fully, as shown in Figure 9. The lock plunger is then latched in the fully retracted position by a latch plate 121 pressed forwardly under a shoulder of the plunger by a spring 122. With the plunger latched in the retracted position the pull wire head 89 is free to move forward, by reason of its telescoping relation to the plunger cap, when the regular transmission is shifted directly through neutral and links 112 collapsed in one direction or the other.

With the lock plunger retracted, thrust rod 71 may move out at any subsequent time when the sun gear torque is sufficient to change from overdrive to direct. In regular low or reverse gear the lock plunger is positively held in retracted position because the intermediate-high shift rod 117 is in neutral position and links 112 remain extended to keep tension on pull wire 87. When the regular transmission is shifted to intermediate or high gear however, links 112 collapse and lock plunger 74 is held retracted solely by latch 121. Therefore, when the unit subsequently goes into direct under torque the thrust rod 71 moves out to kick over a pivoted finger 123 to retract latch plate 121, as shown in Figure 8, and allow plunger 74 to slide clear of latch 121 and move down to seat on a ball.

The importance of the above described mechanism for the overdrive lock will be appreciated by considering the operative sequence in the actual operation of an automobile. When the regular transmission is shifted into either reverse or low gear, lock plunger 74 is positively held out by extended links 112, and torque immediately puts the auxiliary unit in direct drive, which of course is desirable in the lower gear ratios. When the regular transmission is shifted to intermediate gear the positions of the locking parts are as shown in Figure 8. Pull wire head 89 has receded due to the collapse of links 112, and lock plunger 74 rests on one of the balls 78. The unit usually stays in direct at this time because of driving load conditions, and therefore the parts remain as shown in Figure 8 during the shift through intermediate. Upon shifting into high gear, plunger 74 is lifted but returns again to the position shown in Figure 8, the latch 121 being held out at this time by finger 123.

Subsequently, when a coasting load is applied to the unit the latter goes into overdrive, and locking plunger 74 moves to the locking position shown in Figure 2. The unit now stays locked in overdrive unless the plunger is temporarily pulled out by the accelerator pedal or the regular transmission is shifted back into neutral or into a lower gear. For example, consider that the car has come to a stop in overdrive and is then started in second gear, as is often done when coming to a pause at a stop sign in modern driving. When the regular transmission is shifted through neutral into second gear the links 112 are momentarily extended to fully retract and latch locking plunger 74, as shown in Figure 9. Driving thrust is now applied causing the unit to go into direct to cut out the overdrive and provide the full second gear ratio for starting torque. When thrust rod 71 goes forward in the direct drive relationship it releases latch 121 and locking plunger 74 drops down on one of the balls as shown in Figure 8. The shift from intermediate into high gear now takes place as previously described, and the unlatched plunger is conditioned to drop into locking engagement the next time the unit goes into overdrive.

An important feature of the above mentioned control is that it provides means for automatically locking the unit in overdrive, and also provides means responsive to the regular speed change transmission for allowing the unit to go into direct drive at such times when the standard gear ratio is desirable for adequate starting torque.

Briefly, the steps in the operation of the overdrive lock are as follows:

1. When regular transmission is shifted to reverse or low gear the lock plunger 74 is positively held out by tension of the pull wire 87 due to the extended links 112. Auxiliary transmission therefore goes into direct drive under torque of driving load.

2. When regular transmission is shifted from low to intermediate gear (auxiliary unit in direct drive) the lock plunger 74 moves down past the retracted latch plate 121 and seats on a ball 78. Lock plunger 74 is now conditioned to lock up in overdrive, but unit stays in direct because of driving load.

3. When regular transmission is shifted from intermediate to high gear (auxiliary unit still in direct drive) the lock plunger 74 is temporarily retracted but comes back to rest on a ball 78. Then as soon as a coasting load is applied to the unit it goes into overdrive and the lock plunger moves down between the balls to lock the auxiliary transmission in overdrive.

4. When regular transmission is shifted from high to intermediate gear (auxiliary unit in overdrive) the lock plunger 74 is held out by latch 121. The unit may then go into direct drive under torque, to provide the standard second gear ratio for ample starting thrust.

5. The locking plunger may be retracted at any time to allow the unit to change from overdrive to direct by simply depressing the throttle pedal fully, which withdraws lock plunger 74 enough to allow balls 78 to move together under the thrust of the applied torque. In this case the plunger merely sets on a ball and is adapted to relock again immediately upon the unit going into overdrive.

My invention also embodies an improved oiling system for the auxiliary transmission unit. Housing 2 provides a reservoir for holding oil in the usual manner, and the majority of the parts secure adequate lubrication by oil picked up by the rotating elements. The planetary system enclosed within rotor 13 however requires additional consideration.

As shown in Figures 13 and 14, I provide a series of openings 126 about the periphery of ring 53 with lugs 127 between the openings for supporting engagement with rotor 13. The lug sides 128 facing the direction of rotation are inclined as shown in Figure 14 to force oil into the hollow rotor. Lugs 127 therefore also function as pumping impellers. Back sides 129 of the impellers are preferably flat surfaces lying normal to the direction of rotation, so that the partial vacuum developed by cavitation tends to suck the oil into the rotor.

Discharge openings 131 are provided at the opposite end of the rotor, and an annular flange 132 is provided to maintain an adequate oil level within a rotor. Part of the oil within the rotor circulates out past clutch rollers 52 and hence to bearing 54 and out through suitable openings provided at the splined connection between clutch element 62 and the bell-shaped rotor ring 53. Part of the oil within the rotor also flows to the bearings along the drive shaft through suitable oil holes 133 and 134 through the sun gear and its sleeve. Oil through holes 133 also circulates outwardly through helical grooves 136 and hence through holes 137 to the speedometer gears 138 and then back through bearing 21 into the main body of the housing. A suitable oil retaining ring 139 is provided outwardly of speedometer gears 138. Oil holes 141 and 142 are also preferably provided in sun gear extension sleeve 27 and central brake element 26 for oiling other bearing surfaces along the drive shaft. As shown in Figure 11, brake plates 33 are preferably provided with notched openings 143 to allow free outward flow of oil from between the plates when the latter collapse.

Means are further provided for supplying oil to the planet pinion bearings. For this purpose a tapered passage 144 is provided through pinion shaft 9, with a transverse passage 146 to the bearing surfaces. An annular plate 147 is secured over the end face of the planet pinion mounting 11, and is provided with partially raised scoop portions 148 for picking up oil and forcing it into the pinion shaft passages. See Figure 15. Oil is therefore supplied under pressure to the planet pinion bearings.

Cushioning means are also preferably provided for relieving shock between brake pin blocks 38 and fixed element 34 when the blocks move up against the ends of notches 39. As shown in Figure 10, the lower block 38 is provided with flanges 151 for entrapping a quantity of oil between the block and an end of notch 39. A small clearance is provided between the block and base of the recess to form a restricted passage 152 through which the entrapped oil may gradually bleed out. This simple cushioning means effectively relieves shock between the parts.

Figure 10 also shows a signal actuating wire 153 for operating an indicator on the dashboard to show when the unit is in either direct or overdrive. The wire passes through a screw 154 and is secured to one of the tangent springs cups 156 bearing against a block 157. The latter block differs from the other blocks 38 in that it is cut away to allow for engagement of yoke 73 with the brake pin. Provision of such an indicating device is optional, but is desirable because my improved auxiliary transmission operates so smoothly and quietly that even a critical person in the car is unaware of exactly when the overdrive is cut into and out of the drive train.

Figure 19 shows a modified arrangement of the planetary gear system, embodying a safety clutch in combination with direct drive clutch 49. The safety clutch is normally inactive and operates to connect the shafts for direct drive only in the event of failure of clutch 49. The safety clutch is preferably interposed between the planetary pinion carrier 11 and rotor 13 for convenience, and may be an overrunning clutch similar to clutch 49. I prefer however to employ a ratchet device comprising spring pressed pawls 161 pivoted in sockets formed in a ring 162 splined to the hub of the pinion carrier. Pawls 161 project in a substantially radial direction from ring 162 and are engageable with clutch teeth 163 formed on the interior of rotor 13. The pawls have a limited degree of pivotal movement in their sockets, and are urged outwardly by centrifugal force and also by spring pressed tangent plungers 164 slidable in recesses formed in ring 162 and vented through passages 166. The outer faces of the pawls are inclined and lie parallel to complementary inclined faces of the ratchet teeth so that the pawl faces may slide along the back faces of the teeth prior to final engagement. By this arrangement, the spring pressure of the pawls against the inclined faces of the ratchet teeth tends to turn pawl ring 162 clockwise relative to the toothed ring to force the pawls into full engagement.

There are a plurality, say four, of the pawls and these are offset to engage in pairs so that the pawls do not have to move the full width of a tooth prior to engagement. A certain amount of relative movement exists however, prior to tooth engagement, and this lost motion allows the faster acting clutch 49 to engage first. Therefore, the ratchet clutch will not come into play unless the regular clutch 49 for some reason fails to operate.

This improved radial pawl ratchet has several advantages over an ordinary tangent pawl device because it tends to automatically move into engagement, and furthermore the final pivotal motion of the pawls operates to bring them into full engagement with the teeth to insure a positive lock.

Figure 19 also shows a modified structure for the oiling system, comprising a screw type pump having a single convolution impeller 167 formed by a strip seated in helical grooves 168 cut on the outer periphery of bell ring 53 and on the inner periphery of an annular nose piece 169 secured at the end of rotor 13. This impeller screw may be used alone or in combination with impellers 127 previously described; the screw having the advantage of moving a larger volume of oil past the planet pinions and thereby serve to further reduce the temperature of these parts as well as to insure adequate lubrication. If desired, a helical rib-like impeller 171 may also be mounted on the outer periphery of the rotor to project into the space between the latter and the housing 2, to provide means for pumping oil past the outer regions of the rotor.

I claim:

1. In a vehicle having a throttle, the combination of drive and driven shafts, a system for establishing overdrive and direct drive connections between the shafts, means for locking the system in the overdrive connection, means operatively connected with the throttle for unlocking the system to permit change to direct drive, and torque responsive means for effecting said change to direct drive.

2. In a vehicle having a throttle and a speed change transmission including a movable element, the combination of drive and driven shafts, an auxiliary speed change system for establishing different speed ratios between the shafts, means for locking said system in one of its speed ratios, means operatively connected with the throttle and said transmission element for unlocking the system to permit change to another speed ratio, and torque responsive means for effecting change to said other ratio.

ROBERT S. TAYLOR.